US006715340B2

(12) United States Patent
Yamada et al.

(10) Patent No.: US 6,715,340 B2
(45) Date of Patent: Apr. 6, 2004

(54) MISFIRING DETECTION APPARATUS FOR INTERNAL COMBUSTION ENGINE

(75) Inventors: Tatsunori Yamada, Aichi (JP); Yasushi Sakakura, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 174 days.

(21) Appl. No.: 09/953,131

(22) Filed: Sep. 17, 2001

(65) Prior Publication Data

US 2002/0033041 A1 Mar. 21, 2002

(30) Foreign Application Priority Data

Sep. 18, 2000 (JP) .................................. 2000-282128

(51) Int. Cl.[7] ........................ G01L 23/22; G01L 3/26
(52) U.S. Cl. .................................. 73/35.08; 73/117.3
(58) Field of Search .......................... 73/35.08, 117.3

(56) References Cited

U.S. PATENT DOCUMENTS 5,343,844 A 9/1994 Fukui et al. ................ 123/481
5,425,339 A 6/1995 Fukui
5,452,603 A 9/1995 Asano et al.
5,861,551 A 1/1999 Morita et al.
5,925,819 A 7/1999 Yoshinaga et al.

FOREIGN PATENT DOCUMENTS

DE 196 18 980 A1 11/1996
JP 2505620 4/1996 ............ F02P/17/12

*Primary Examiner*—Edward Lefkowitz
*Assistant Examiner*—Maurice Stevens
(74) *Attorney, Agent, or Firm*—Sughrue Mion, PLLC

(57) ABSTRACT

A misfiring detection apparatus including a comparison unit 22 and a time counting unit 24 which accumulates periods of time during which the ion current flowing between the center electrode 10*a* and the ground electrode 10*b* of a spark plug 10 exceeds a predetermined current value; and an ECU 26 which judges that misfiring has occurred when a total of the accumulated periods is not greater than a predetermined value. The ion current is thus determined as a cumulative value of ion current generation periods. Therefore, even when the ion current contains a discharge noise component, the discharge noise component having a short duration accounts for only a small portion of the cumulative value, so that the influence of the discharge noise component on misfiring detection can be reduced. As a result, misfiring detection can be performed with improved accuracy.

4 Claims, 6 Drawing Sheets

MISFIRING DETECTION APPARATUS FOR INTERNAL COMBUSTION ENGINE

1. Field of the Invention

The present invention relates to a misfiring detection apparatus for an internal combustion engine which detects a misfire in a cylinder of the internal combustion engine by measuring ion current flowing between the center and ground electrodes of a spark plug attached to the cylinder.

2. Description of the Related Art

A known technique for detecting misfiring or the like of an internal combustion engine utilizes ion current. Ion current flows, after spark discharge of a spark plug attached to the internal combustion engine, due to ions present in the vicinity of the electrodes of the spark plug.

An example of such a technique is disclosed in Japanese Patent Application Laid-Open (kokai) No. 4-54283 ("Apparatus for Detecting Misfiring of Internal Combustion Engine"). In this technique, an ion current component is integrated by means of a current-component detector (integrator); and a value obtained by integration is compared with a predetermined threshold value in order to detect misfiring of the internal combustion engine.

3. Problems Solved by the Invention

However, in the above misfiring detection apparatus for an internal combustion engine, since the ion current component is integrated by means of a current-component detector (integrator), as shown in FIG. 6, not only the ion current component but also an unnecessary discharge noise component is integrated.

Since the absolute level of the discharge noise component, which stems from residual energy of an ignition coil and is superposed on the ion current, tends to be higher at the time of misfiring as compared with at the time of firing, the ion current component includes many discharge noise components during misfiring. Further, the peak value of the discharge noise component is far larger than the ion current component, although the duration of the discharge noise component is shorter than that of the ion current component.

Therefore, the discharge noise component accounts for a non-negligible portion of the integration value output from the current component detector. Thus, such discharge noise component is a source of error in the integration value output from the current component detector, which error may reduce the accuracy in detecting misfiring.

Moreover, since the peak value of such discharge noise component varies depending on the state of combustion within a relevant cylinder, a discharge noise component having a peak value greater than the input limit voltage of the current component detector may be input to the current component detector. This may cause a failure of the current component detector or other components.

SUMMARY OF THE INVENTION

The present invention has been achieved in light of the above-described problems of the prior art. It is therefore an object of the present invention to provide a misfiring detection apparatus for an internal combustion engine which can improve accuracy of misfiring detection.

The present invention achieves the above object in a first embodiment by providing a misfiring detection apparatus for an internal combustion engine which detects a misfire in a cylinder of the internal combustion engine by measuring ion current flowing between the center and ground electrodes of a spark plug attached to the cylinder. The apparatus is characterized as comprising:

accumulating means for accumulating periods of time during which the ion current exceeds a predetermined current value; and misfiring detection means for judging that misfiring has occurred when a total of periods accumulated by the accumulating means is not greater than a predetermined value.

In a second embodiment, the misfiring detection apparatus for an internal combustion engine is characterized in that the accumulating means comprises:

comparison means for (i) judging whether the ion current is not less than the predetermined current value by comparing the ion current to the predetermined current value, and (ii) outputting a comparison result; and counting means for counting periods of time during which the comparison result output by the comparison means indicates that the ion current is not less than the predetermined current value.

In a third embodiment, the detection apparatus for an internal combustion engine of the second embodiment is characterized in that the counting means includes a CR integration circuit.

In a fourth embodiment, the misfiring detection apparatus for an internal combustion engine of the second embodiment is characterized in that the counting means includes a digital counting circuit.

In the first embodiment, the accumulating means accumulates periods of time during which the ion current flowing between the center and ground electrodes of a spark plug exceeds a predetermined current value; and the misfiring detection means judges that misfiring has occurred when a total of periods accumulated by the accumulating means is not greater than a predetermined value. Thus, the ion current can be determined as a cumulative value of ion current generation periods. That is, since the ion current is determined not as a cumulative value of current-related values but as a cumulative value of time-related values, even when the ion current contains a discharge noise component, the discharge noise component having a short duration accounts for only a small portion of the cumulative value.

In the second embodiment the accumulating means includes comparison means and counting means. The comparison means judges whether the ion current is not less than the predetermined current value by comparing the ion current to the predetermined current value and outputs a comparison result. The counting means counts periods of time during which the comparison result output by the comparison means indicates that the ion current is not less than the predetermined current value. Thus, the function of accumulating periods of time during which the ion current exceeds a predetermined current value can be realized by the comparison means and the counting means.

In the third embodiment, since the counting means includes a CR integration circuit, the counting means can be realized by an analog circuit. Thus, the cumulative period of time during which the ion current exceeds a predetermined current value can be detected as an analog value.

In the fourth embodiment, since the counting means includes a digital counting circuit, the counting means can be realized by a digital circuit. Thus, the cumulative period of time during which the ion current exceeds a predetermined current value can be detected as a digital value.

BRIEF DESCRIPTION OF THE DRAWINGS

FIG. 2 shows circuit diagrams of example configurations of the time counting unit according to the embodiment of FIG. 1 in which FIG. 2(A) is a configuration including a CR integration circuit and a comparator, FIG. 2(B) is a configuration including a CR integration circuit and an A/D converter, and FIG. 2(C) is a configuration including a digital counting circuit.

DESCRIPTION OF DRAWING SYMBOLS

10: spark plug

10*a*: center electrode

10*b*: ground electrode

12: ignition coil

20, 20': ion current detection circuit

22: comparison unit (comparison means)

24: time counting unit (count means)

26: ECU (misfiring detection means)

DESCRIPTION OF THE PREFERRED EMBODIMENTS

An embodiment of the misfiring detection apparatus for an internal combustion engine according to the present invention will now be described with reference to the drawings. However, the present invention should not be construed as being limited thereto.

Figure 1:
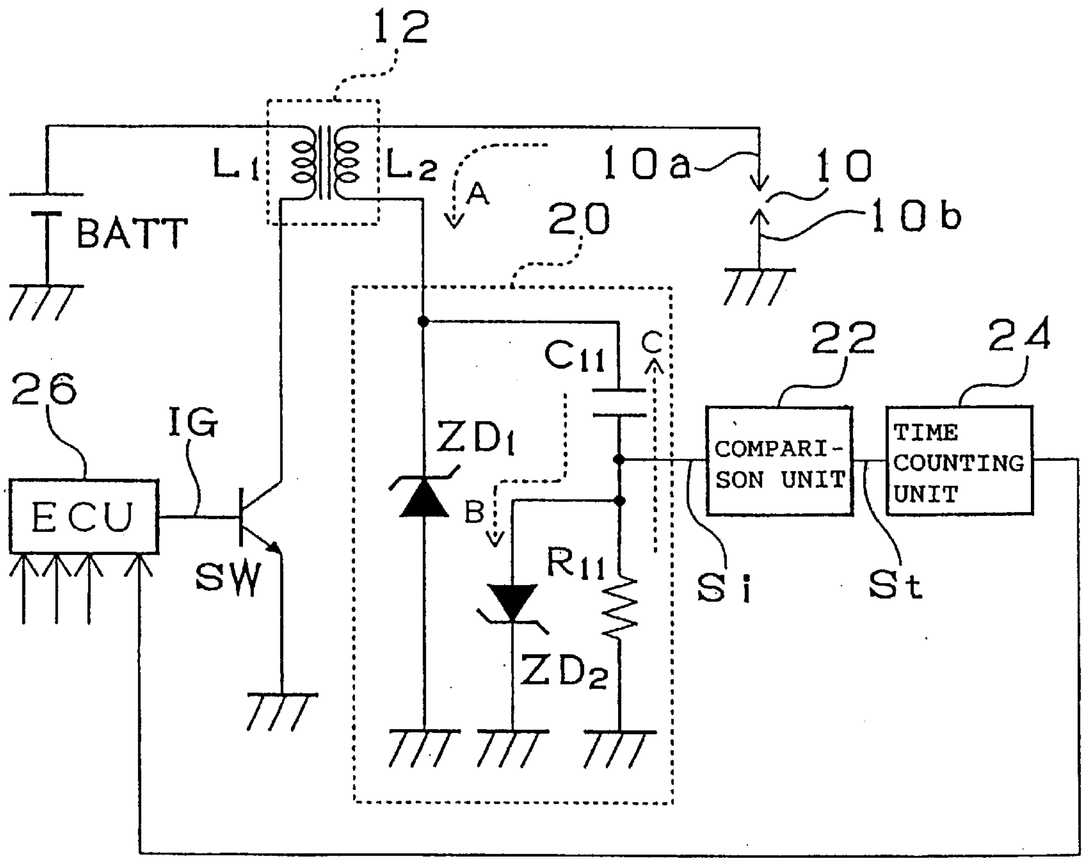
FIG. 1 is a circuit diagram showing the configuration of a misfiring detection apparatus for an internal combustion engine according to an embodiment of the present invention.

As shown in FIG. 1, the misfiring detection apparatus for an internal combustion engine (hereinafter referred to as a "misfiring detection apparatus") detects misfiring of an internal combustion engine by monitoring ion current which flows, after spark discharge of a spark plug 10 attached to the internal combustion engine, due to ions present in the vicinity of a center electrode 10*a* and a ground electrode 10*b* of the spark plug 10. The misfiring detection apparatus is mainly constituted by an ion current detection circuit 20, a comparison unit 22, a time counting unit 24, and an engine control unit (hereinafter referred to as an "ECU") 26.

In a cylinder of the internal combustion engine, ions are generated during combustion after spark discharge by the spark plug 10, and the resistance between the center electrode 10*a* and the ground electrode 10*b* varies depending on the amount of generated ions. The amount of generated ions varies greatly depending on the state of combustion of the internal combustion engine; i.e., the operation conditions of the internal combustion engine. Therefore, when voltage is externally applied to the spark plug 10 after application of an ignition voltage thereto and current flowing through the spark plug 10 is detected, a variation in the resistance between the electrodes of the spark plug; i.e., a variation in operation conditions, can be detected.

Before describing the configuration of the misfiring detection apparatus, a configuration for applying ignition voltage to the spark plug 10 will be described.

One end of a secondary winding $L_2$ of an ignition coil 12 is connected to the center electrode 10*a* of the spark plug 10; and the other end of the secondary winding $L_2$ of the ignition coil 12 is connected to the ground electrode 10*b* of the spark plug 10 via the ion current detection circuit 20.

A positive terminal of a battery BATT is connected to one end of a primary winding $L_1$ of the ignition coil 12; and a negative terminal of the battery BATT is connected to the other end of the primary winding $L_1$ of the ignition coil 12 via a switching element SW. The base terminal of the switching element SW is connected to the ECU 26. The switching element SW is turned on and off by means of an IG signal from the ECU 26.

When the ECU 26 establishes and breaks electrical continuity between the emitter and collector of the switching element SW, a high voltage (several tens of kV) corresponding to the turn ratio ($L_1$:$L_2$) of the ignition coil 12 is generated across the secondary winding $L_2$ of the ignition coil 12. Thus, spark discharge occurs between the electrodes (the center electrode 10*a* and the ground electrode 10*b*) of the spark plug 10 due to the high voltage supplied from the secondary winding $L_2$.

Figure 2:
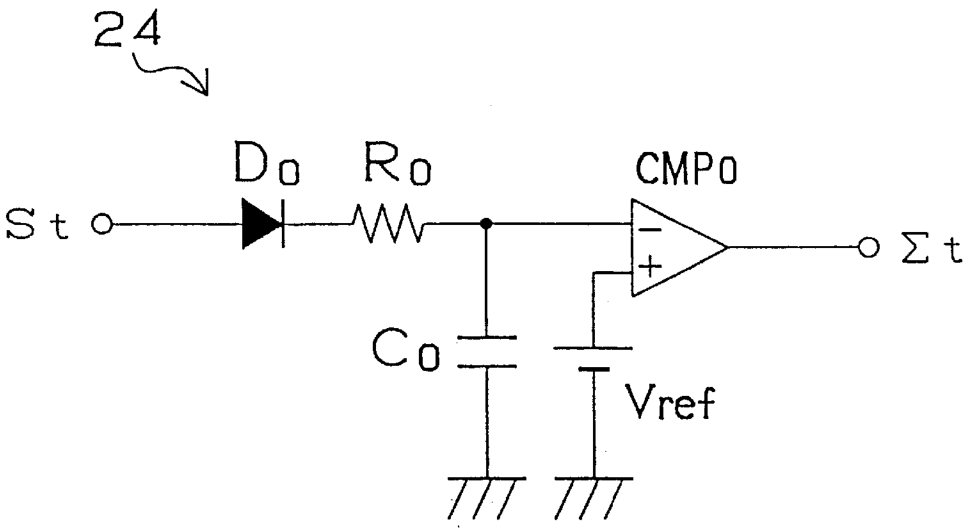
Figure 2:
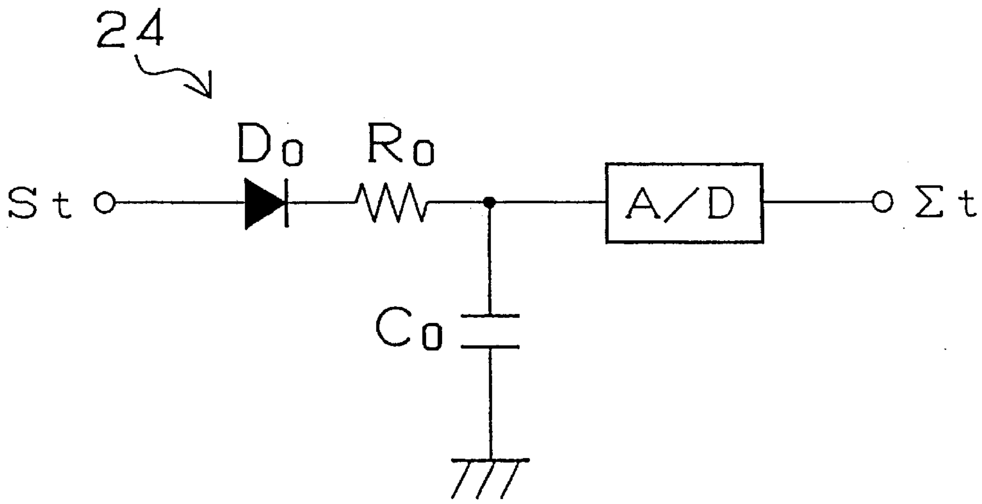
Figure 2:
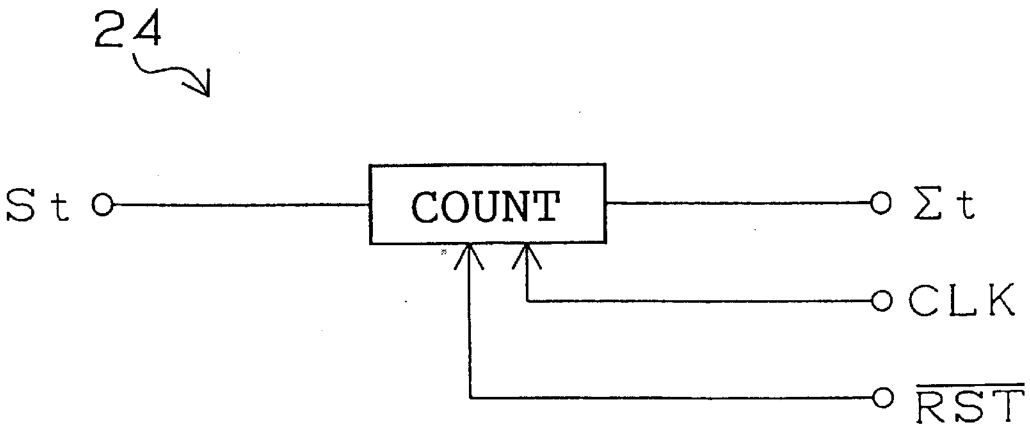

Next, the configuration of the misfiring detection apparatus will be described with reference to FIGS. 1 to 3.

The ion current detection circuit 20 is constituted by Zener diodes $ZD_1$ and $ZD_2$, a capacitor $C_{11}$, and a resistor $R_{11}$.

The Zener diode $ZD_1$ has a Zener voltage of, for example, 300 V and serves as a voltage regulation diode. The Zener diode $ZD_1$ is connected between the secondary winding $L_2$ of the ignition coil 12 and the ground. That is, the cathode terminal of the Zener diode $ZD_1$ is connected to the other end of the secondary winding $L_2$; and the anode terminal thereof is grounded.

The capacitor $C_{11}$ and the resistor $R_{11}$ are connected in series. The capacitor $C_{11}$ end of the series circuit is connected to the cathode terminal of the Zener diode $ZD_1$, and the resistor $R_{11}$ end of the series circuit is grounded, so that the capacitor $C_{11}$ and the resistor $R_{11}$ are disposed between the cathode terminal of the Zener diode $ZD_1$ and the ground. Further, the Zener diode $ZD_2$ is connected in parallel to the resistor $R_{11}$ such that the cathode terminal of the Zener diode $ZD_2$ is grounded. The Zener diode $ZD_2$ has a Zener voltage lower than the input limit voltage (permitted maximum input voltage) of the comparison unit 22.

In the ion current detection circuit 20 having the above-described configuration, upon spark discharge at the spark plug 10, a discharge current flows in the direction of arrow A in FIG. 1; i.e., a discharge current flows from the secondary winding $L_2$ of the ignition coil 12 toward the ground via the capacitor $C_{11}$ and the Zener diode $ZD_2$ (in the direction of arrow B). As a result, a charge corresponding to 300 V is accumulated in the capacitor $C_{11}$ due to action of the Zener diode $ZD_1$.

After completion of the spark discharge of the spark plug 10, ions are generated between the electrodes (the center electrode 10*a* and the ground electrode 10*b*) of the spark plug 10, so that an ion current path is formed. Thus, due to the charge accumulated in the capacitor $C_{11}$, current flows in the direction of arrow C in FIG. 1; i.e., the direction opposite the direction of arrow A for discharge current, via the secondary winding $L_2$ of the ignition coil 12, the spark plug 10, and the resistor $R_{11}$. That is, ion current flows between the electrodes of the spark plug 10; and voltage corresponding to the amplitude of the ion current is generated across the resistor $R_{11}$. Therefore, the amplitude of the ion current can be detected by detecting the voltage, output as an ion current signal Si from the node between the resistor $R_{11}$ and the capacitor $C_{11}$.

Figure 3:
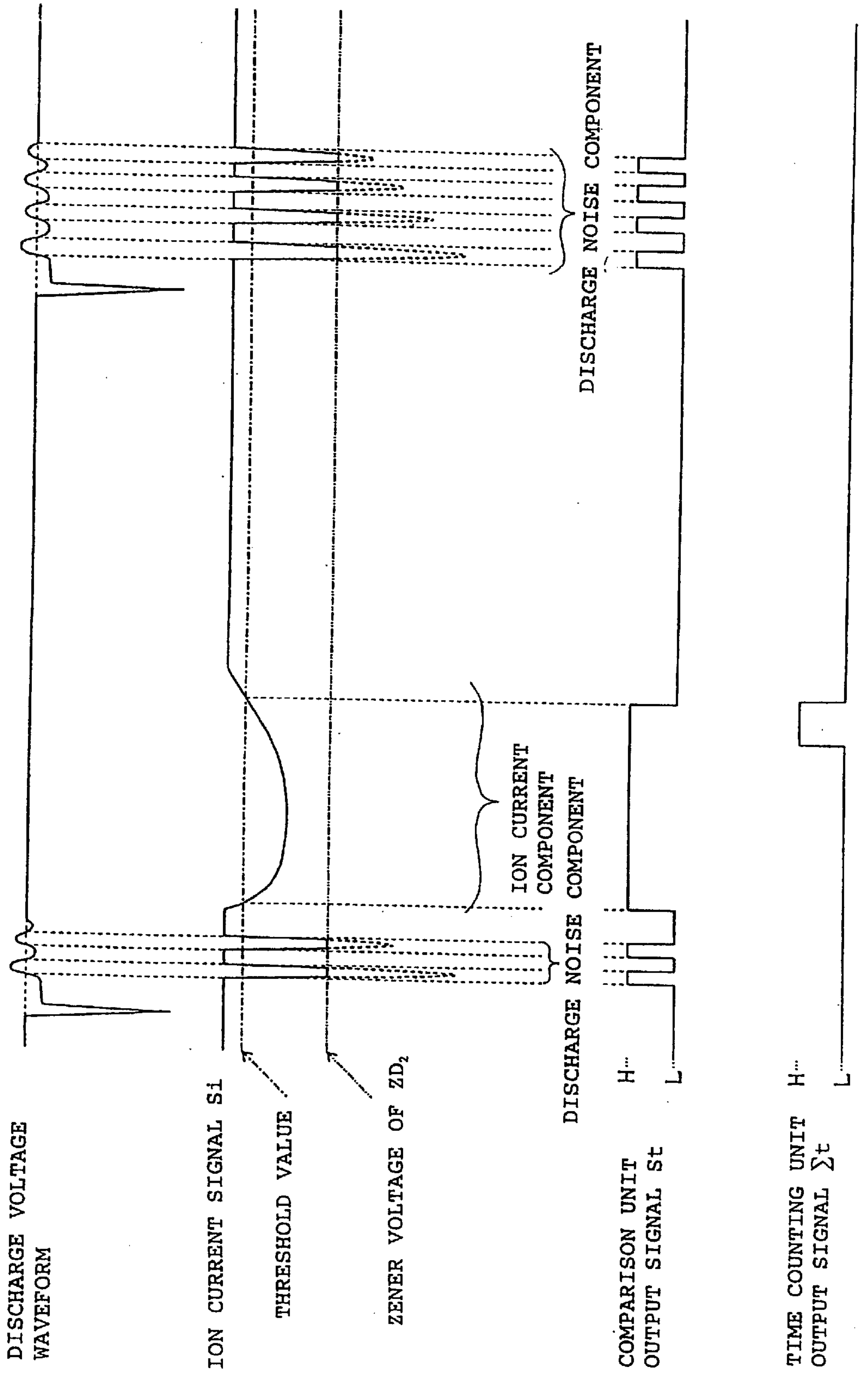
FIG. 3 is a time chart showing the relationship between ion current signal Si and output signal St of the comparison unit in the misfiring detection apparatus for an internal combustion engine according to the embodiment of FIG. 1.

Since the Zener diode $ZD_2$ has a Zener voltage lower than the input limit voltage (permitted maximum input voltage) of the comparison unit 22, as shown in FIG. 3, excessively high voltage is not input to the input terminal of the comparison unit 22. Therefore, even when the peak value of discharge noise components varies depending on the state of combustion in the relevant cylinder, no discharge noise component having a voltage greater than the input limit voltage of the comparison unit 22 is input to the comparison unit 22. Accordingly, failure of the comparison unit 22 due to such an excessively large input can be avoided. A broken line in FIG. 3 represents portions of the discharge noise component removed by the Zener diode $ZD_2$.

The comparison unit 22 includes a comparator, a reference voltage source, and other components. The comparison unit 22 compares the absolute value of the ion current signal Si output from the ion current detection circuit 20 with a predetermined reference voltage, and outputs comparison results to an output terminal. Specifically, the comparator of the comparison unit 22 compares the voltage level of the signal (ion current signal Si) input to one input terminal with a reference voltage input to the other input terminal.

The reference voltage source of the comparison unit 22 determines a "threshold value" used for judging whether the voltage level of the ion current signal Si is high or low. In the case in which, as shown in FIG. 3, the ion current signal Si varies in the negative direction when discharge voltage becomes positive, the threshold voltage is set to a voltage which is lower by a predetermined amount than a voltage level in the steady state in which no discharge occurs. In the case in which the ion current signal Si varies in the positive direction when discharge voltage becomes positive, the threshold voltage is set to a voltage which is higher by a predetermined amount than the voltage level in the steady state in which no discharge occurs.

When an ion current signal Si having a voltage level higher than the threshold voltage is input to the comparison unit 22, an L-level output signal is output from the output terminal of the comparison unit 22. When an ion current signal Si having a voltage level lower than the threshold voltage is input to the comparison unit 22, an H-level output signal is output from the output terminal of the comparison unit 22. Therefore, as shown in FIG. 3, the H-level of the output signal St from the comparison unit 22 represents the presence of an ion current component or a discharge noise component.

The ECU (engine control unit) 26 includes a main storage device, a micro computer containing various registers, an input/output interface, and other components. The ECU performs various electronic control functions in relation to the internal combustion engine.

In the misfiring detection apparatus of the present embodiment, the ECU 26 controlls the timing of turning the switching element on and off, and a function of judging that misfiring has occurred in the cylinder of the internal combustion engine when the time-accumulated value output from the time counting unit 24 is not greater than a predetermined value.

The time counting unit 24 is disposed in a stage following the comparison unit 22, and, as shown in FIG. 2(A), includes a diode Do, a resistor Ro, a capacitor Co, a comparator CMPo, and a comparison voltage source Vref.

Specifically, the diode Do is connected in series to the output terminal St of the comparison unit 22 while being oriented in the forward direction; and the resistor Ro is connected to the cathode terminal of the diode Do, so that the diode Do and the resistor Ro are connected in series. Further, the capacitor Co is disposed between the ground and a terminal of the resistor Ro opposite the diode Do. When the diode Do, the resistor Ro, and the capacitor Co are connected in the above-described manner, the resistor Ro and the capacitor Co constitute a CR integration circuit, and the diode Do prevents reverse flow of charge from the capacitor Co toward the comparison unit 22.

The output terminal of the CR integration circuit constituted by the resistor Ro and the capacitor Co is connected to the inverted input terminal of the comparator CMPo; and the comparison voltage source Vref is connected to the non-inverted input terminal of the comparator CMPo. Therefore, the comparator CMPo compares the voltage level of the signal input to the inverted input terminal with voltage output from the comparison voltage source Vref and outputs a comparison result to the output terminal as an output signal Σt (digital signal). That is, the voltage output from the comparison voltage source Vref is set in such manner that the comparator CMPo outputs the output signal Σt when the amount of charge accumulated in the CR integration circuit exceeds a predetermined level.

Since the comparison unit 22 is configured in the above-described manner, periods of time over which the comparison unit 22 outputs the output signal St can be integrated, or counted. Further, as shown in FIG. 3, when the counted period of time reaches a predetermined period of time, this can be detected on the basis of the output signal Σt of the comparator CMPo.

In other words, since the ion current component of the ion current signal Si is determined as a cumulative value of ion current generation periods, the ion current can be determined as a count value of time-related values, not as a cumulative value of current-related values. Therefore, even when the ion current contains a discharge noise component, the discharge noise component having a short duration accounts for only a small portion of the cumulative value, so that the influence of the discharge noise component can be reduced. Accordingly, the ECU 26 can detect misfiring in the cylinder with improved accuracy by detecting, on the basis of the output signal Σt of the comparator CMPo, that the time-accumulated value obtained by the time counting unit 24 is not greater than the predetermined value.

Further, in the time counting unit 24, the counting means is realized by the CR integration circuit constituted by the resistor Ro and the capacitor Co, which is an analog circuit. Therefore, the cumulative period of time during which the ion current exceeds a predetermined current value can be detected as an analog value until the cumulative period of time reaches a predetermined period of time. This enables variation in the cumulative period of time to be detected as a continuous variable. Accordingly, the accuracy of misfiring detection by the ECU 26 can be improved.

FIGS. 2(B) and 2(C) show modifications of the time counting unit 24.

In the time counting unit 24 shown in FIG. 2(B), in place of the comparator CMPo, an A/D converter is provided in a stage succeeding the above-described CR integration circuit.

In this modification, since the A/D converter is provided in a stage succeeding the CR integration circuit constituted by the resistor Ro and the capacitor Co, an analog signal output from the above-described CR integration circuit can be converted by the A/D converter to a digital signal serving as the output signal Σt. Thus, ion current detected in the form of a time count can be determined in more detail as digital data. Accordingly, the accuracy of misfiring detection by the ECU 26 can be further improved.

The time counting unit 24 shown in FIG. 2(C) is constituted by a digital counting circuit.

In this modification, the output signal St of the comparison unit 22 is input to the input terminal of a digital counter COUNT. The digital counter COUNT samples the output signal St of the comparison unit 22 at predetermined sampling intervals (CLK) and increments the count value. When the count value reaches a predetermined count value, the digital counter COUNT outputs the output signal Σt. Further, when a reset signal ($\overline{RST}$) is input to the reset terminal, the count value is reset to an initial value. This configuration enables counting of a period during which the comparison unit 22 outputs the output signal St, and makes a judgment based on the time count value, as in the above-described case in which a judgment based on the time count is performed by the comparator CMPo.

In other words, since the time counting unit 24 is constituted by a digital counting circuit, the cumulative period of time during which the ion current exceeds a predetermined current value can be detected as a digital value until the cumulative period of time reaches a predetermined period of time. Accordingly, the signal processing performed by the ECU 26 can be further simplified.

Figure 4:
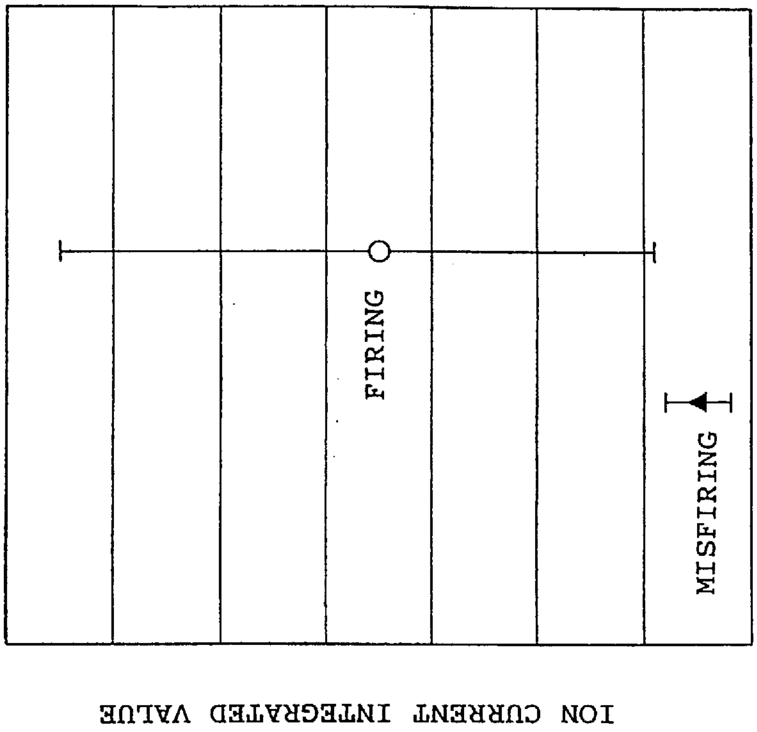
FIG. 4(A) is a characteristic diagram showing misfiring detection by the misfiring detection apparatus for an internal combustion engine according to the embodiment of FIG. 1.
FIG. 4(B) is a characteristic diagram showing misfiring detection by the misfiring detection apparatus for an internal combustion engine according to a comparative example.
Figure 4:
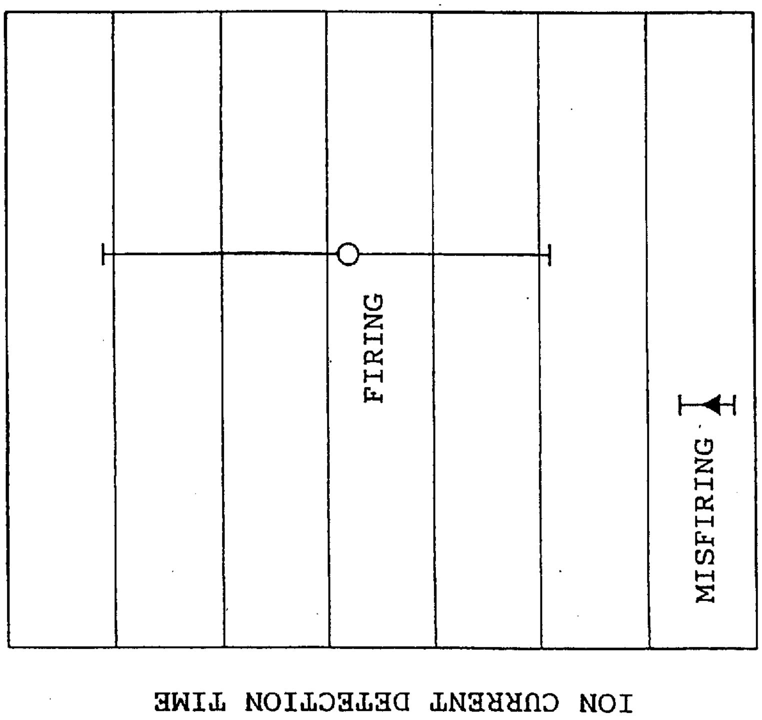

FIG. 4 shows the results of a comparison experiment in which the judgment of the above-described misfiring detection apparatus was evaluated for the case of firing and the case of misfiring.

Figure 6:
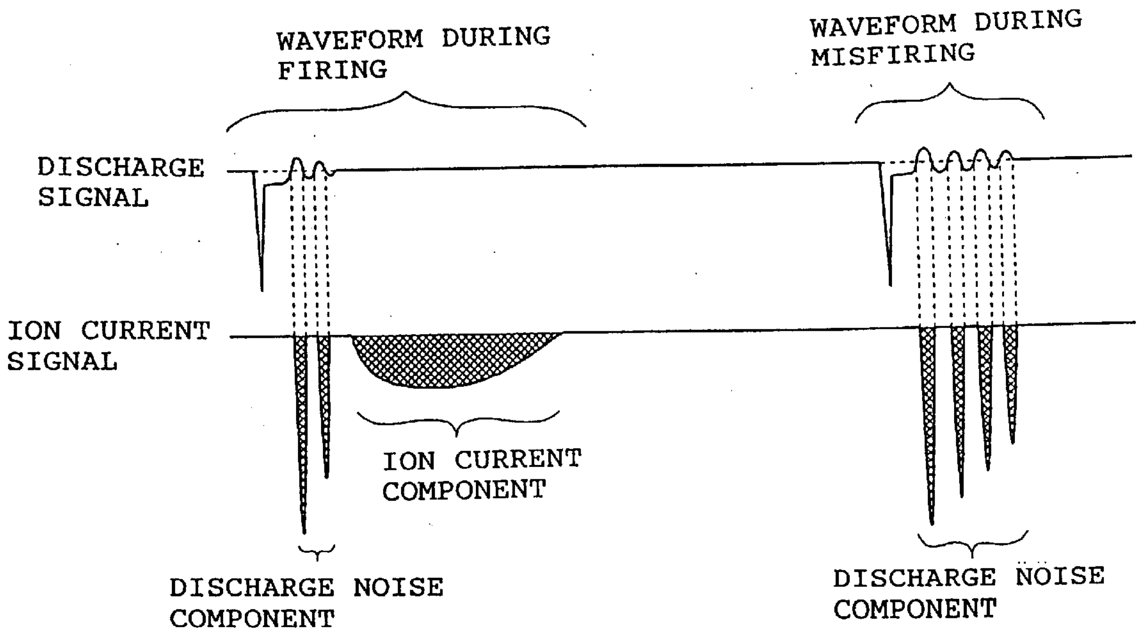
FIG. 6 is an explanatory view showing components of an ion current signal detected by a conventional misfiring detection apparatus for an internal combustion engine.

As shown in FIG. 4(B), in the case of a conventional misfiring detection apparatus which integrates ion current, many discharge noise components are integrated together with an ion current component (see FIG. 6). Thus, the misfire judgment area and the fire judgment area are close to each other due to discharge noise errors. That is, firing may have failed even when firing is detected and firing may be effected properly even when misfiring is detected.

By contrast, in the misfiring detection apparatus of the present embodiment, the ion current is determined not as a cumulative value of current-related values but as a cumulative value of time-related values. Thus, even when the ion current contains a discharge noise component, the discharge noise component having a short duration accounts for only a small portion of the cumulative value. Therefore, as shown in FIG. 4(A), the present inventors confirmed that the misfire judgment area and the fire judgment area are not close to each other, such that the ECU 26 can reliably detect misfiring in the relevant cylinder.

As described above, in the misfiring detection apparatus of the present embodiment, the comparison unit 22 and the time counting unit 24 accumulate periods of time during which the ion current flowing between the center electrode 10*a* and the ground electrode 10*b* of the spark plug 10 exceeds a predetermined current value; and the ECU 26 judges that misfiring has occurred when a total of the accumulated periods is not greater than a predetermined value. Thus, the ion current can be determined as a cumulative value of ion current generation periods. Therefore, even when the ion current contains a discharge noise component, the discharge noise component having a short duration accounts for only a small portion of the cumulative value, so that the influence of the discharge noise component can be reduced. Accordingly, detection of misfiring can be performed with improved accuracy.

Moreover, in the misfiring detection apparatus of the present embodiment, the comparison unit 22 judges whether the ion current is not less than the predetermined current value by comparing the ion current to the predetermined value and outputs a comparison result; and the time counting unit 24 counts periods of time during which the comparison result output by the comparison unit indicates that the ion current is not less than the predetermined current value. Thus, the function of accumulating periods of time during which the ion current exceeds a predetermined current value can be realized by the comparison unit 22 and the time counting unit 24. Therefore, the accuracy in misfiring detection can be improved with relative ease.

A misfiring detection apparatus according to another embodiment of the invention which includes an ion current detection circuit 20', which is a modification of the ion current detection circuit 20, will next be described with reference to FIG. 5. Structural portions substantially identical with those of the ion current detection circuit 20 are denoted by the same reference numerals and letters, and their repeated descriptions are thus omitted.

Figure 5:
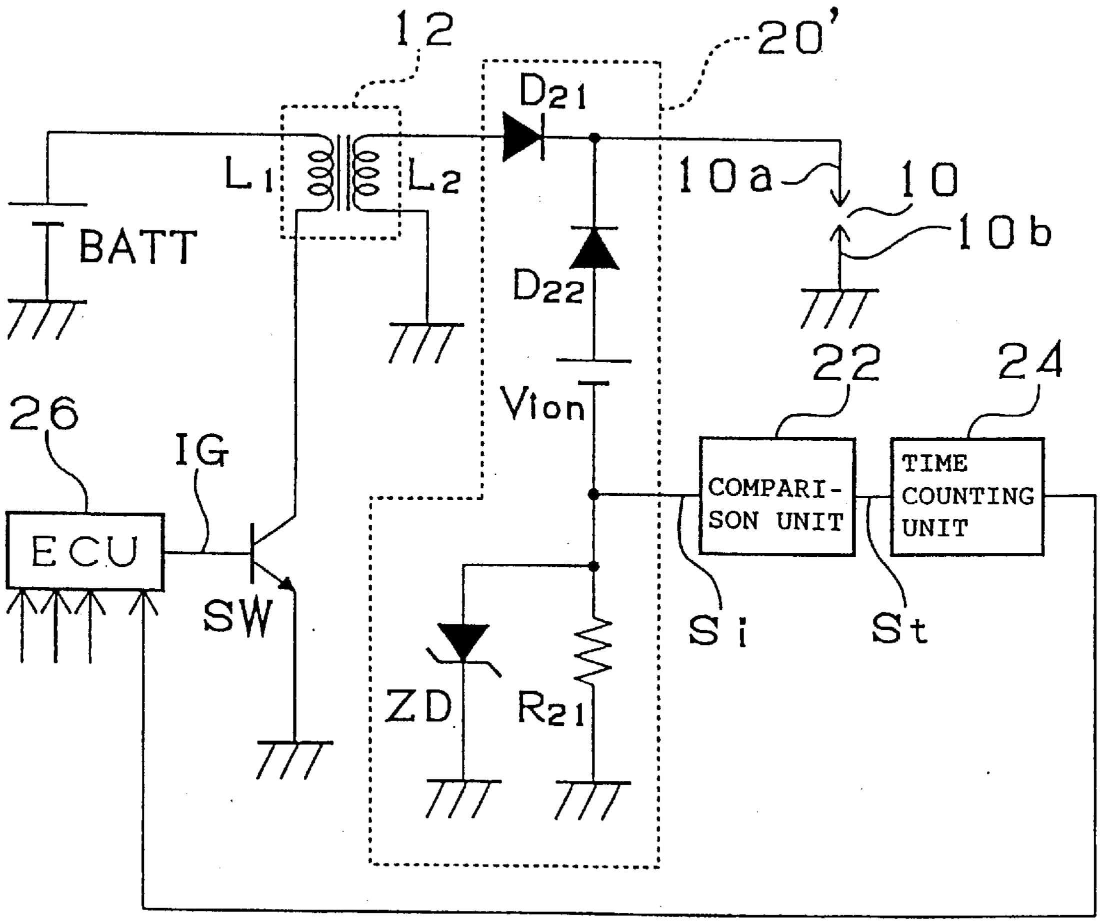
FIG. 5 is a circuit diagram showing the configuration of the misfiring detection apparatus for an internal combustion engine according to another embodiment of the present invention.

The ion current detection circuit 20' is effective in the case in which the spark plug 10 causes a so-called positive discharge, and, as shown in FIG. 5, is constituted by diodes $D_{21}$ and $D_{22}$, a Zener diode ZD, an ion current power source Vion, and a resistor $R_{21}$.

The diode $D_{21}$ is connected in series between the secondary winding $L_2$ of the ignition coil 12 and the spark plug 10, while being oriented forward toward the spark plug 10. The diode $D_{21}$ prevents flow of current from the ion current power source Vion toward the ignition coil 12. The cathode terminal of the diode $D_{22}$ is connected to the cathode terminal of the diode $D_{21}$, and the positive terminal of the ion current power source Vion is connected to the anode terminal of the diode $D_{22}$. The diode $D_{22}$ prevents application of voltage from the secondary winding $L_2$ of the ignition coil 12 to the ion current power source Vion.

The resistor $R_{21}$ is disposed between the negative terminal of the ion current power source Vion and the ground. The resister $R_{21}$ enables detection, as a voltage value, of ion current which is caused to flow between the electrodes of the spark plug 10 by the ion current power source Vion. Further, the Zener diode ZD is connected in parallel to the resistor $R_{21}$ such that the cathode terminal of the Zener diode ZD is grounded. The Zener diode ZD has a Zener voltage lower than the input limit voltage of the comparison unit 22.

In the ion current detection circuit 20' having the above-described configuration, when the voltage of the center electrode 10*a* of the spark plug 10 becomes lower than the voltage of the ion current power source Vion after completion of spark discharge caused by means of the secondary winding $L_2$ of the ignition coil 12, ion current originating from the ion current power source Vion flows through the gap between the electrodes of the spark plug 10 via the diode $D_{22}$ and the resistor $R_{21}$. Since a voltage corresponding to the ion current is generated between the opposite ends of the resistor $R_{21}$, an ion current signal Si can be obtained by detecting that voltage as in the case of the above-described ion current detection circuit 20.

Moreover, as in the case of the Zener diode $ZD_2$ of the above-described ion current detection circuit 20, the Zener diode ZD has a Zener voltage lower than the input limit voltage of the comparison unit 22, so that excessively high voltage is not input to the input terminal of the comparison unit 22. Therefore, even when the peak value of discharge noise components varies depending on the state of combustion in the relevant cylinder, no discharge noise component having a voltage greater than the input limit voltage of the comparison unit 22 is input to the comparison unit 22. Accordingly, failure of the comparison unit 22 due to such an excessively large input can be avoided.

Use of the misfiring detection apparatus including the ion current detection circuit 20' allows the ion current signal Si to be easily obtained even when the spark plug 10 causes a so-called positive discharge. Accordingly, when the spark plug 10 is a positive discharge type spark plug, the accuracy of misfiring detection can be improved with relative ease.

EFFECTS OF THE INVENTION

In the first embodiment of the invention, the accumulating means accumulates periods of time during which the ion current flowing between the center and ground electrodes of a spark plug exceeds a predetermined current value; and the misfiring detection means judges that misfiring has occurred when a total of periods accumulated by the accumulating means is not greater than a predetermined value. Thus, the ion current can be determined as a cumulative value of ion current generation periods. That is, since the ion current is determined not as a cumulative value of current-related values but as a cumulative value of time-related values, even when the ion current contains a discharge noise component, the discharge noise component having a short duration accounts for only a small portion of the cumulative value. Accordingly, the influence of the discharge noise component can be reduced, and thus the accuracy in misfiring detection can be improved.

In the second embodiment of the invention, the accumulating means includes comparison means and counting means. The comparison means judges whether the ion current is not less than the predetermined current value by comparing the ion current to the predetermined current and outputs a comparison result. The counting means counts periods of time during which the comparison result output by the comparison means indicates that the ion current is not less than the predetermined current value. Thus, the function of accumulating periods of time during which the ion current exceeds a predetermined current value can be realized by the comparison means and the counting means. Therefore, the accuracy in misfiring detection can be improved with relative ease.

In the third embodiment of the invention, since the counting means includes a CR integration circuit, the counting means can be realized by an analog circuit. Thus, the cumulative period of time during which the ion current exceeds a predetermined current value can be detected as an analog value. As a result, the accuracy in misfiring detection can be further improved.

In the fourth embodiment of the invention, the counting means includes a digital counting circuit such that the counting means can be realized by a digital circuit. Thus, the cumulative period of time during which the ion current exceeds a predetermined current value can be detected as a digital value. Accordingly, signal processing can be made easier, for example, by means of a microcomputer.

It should further be apparent to those skilled in the art that various changes in form and detail of the invention as shown and described above may be made. It is intended that such changes be included within the spirit and scope of the claims appended hereto. his application is based on Japanese Patent Application No. 2000-282128 filed Sep. 18, 2000, the disclosure of which is incorporated reference in its entirety.

What is claimed is:

1. Misfiring detection apparatus for an internal combustion engine which detects a misfire in a cylinder of the internal combustion engine by measuring ion current flowing between the center and ground electrodes of a spark plug attached to the cylinder, said apparatus comprising:

accumulating means for accumulating periods of time during which the ion current exceeds a predetermined current value; and misfiring detection means for judging that misfiring has occurred when a total of periods accumulated by the accumulating means is not greater than a predetermined value.

2. The misfiring detection apparatus for an internal combustion engine as claimed in claim 1, wherein the accumulating means comprises:

comparison means for (i) judging whether the ion current is not less than the predetermined current value by comparing the ion current to the predetermined current value, and (ii) outputting a comparison result; and counting means for counting periods of time during which the comparison result output by the comparison means indicates that the ion current is not less than the predetermined current value.

3. The misfiring detection apparatus for an internal combustion engine as claimed in claim 2, wherein the counting means includes a CR integration circuit.

4. The misfiring detection apparatus for an internal combustion engine as claimed in claim 2, wherein the counting means includes a digital counting circuit.

* * * * *